(12) United States Patent
Naghi et al.

(10) Patent No.: US 6,318,873 B1
(45) Date of Patent: *Nov. 20, 2001

(54) APPARATUS FOR ILLUMINATING A PORTABLE ELECTRONIC OR COMPUTING DEVICE

(75) Inventors: David Naghi, Los Angeles; Gilbert Fregoso, Santa Ana, both of CA (US)

(73) Assignees: Technology Creations, Inc., Los Angeles; Design Rite, LLC, Fontana, both of CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,692

(22) Filed: Nov. 13, 2000

Related U.S. Application Data

(63) Continuation of application No. 09/330,322, filed on Jun. 11, 1999, now Pat. No. 6,186,636.

(51) Int. Cl.[7] ..................................... F21V 33/00
(52) U.S. Cl. .................. 362/85; 362/84; 362/253; 362/285; 362/109; 362/198; 362/311; 362/197
(58) Field of Search ................ 362/85, 84, 253, 362/285, 109, 198, 311, 197

(56) References Cited

U.S. PATENT DOCUMENTS

| D. 238,959 | 2/1976 | Kurokawa | D26/107 X |
|---|---|---|---|
| D. 251,687 | 4/1979 | Kurokawa | D26/107 |
| D. 377,840 | 2/1997 | Chang | D26/62 |
| D. 418,240 | 12/1999 | Sherman | D26/63 |
| 1,651,307 | 11/1927 | Wilkinson | 362/226 X |
| 3,065,339 | 11/1962 | Fahey, Jr. | 362/308 X |
| 5,122,937 | 6/1992 | Stoudemire | 362/109 |
| 5,122,941 | 6/1992 | Gross et al. | 362/276 |
| 5,136,477 | 8/1992 | Lemmy | 362/198 |
| 5,183,325 | 2/1993 | Hurdle | 362/109 |
| 5,379,201 | 1/1995 | Friedman | 362/191 |
| 5,615,945 | 4/1997 | Tseng | 362/226 |

OTHER PUBLICATIONS

"Ultimate Palmtop Computer Lights®" internet web page printout; http://www.std.com/sfl/3.pct.html; printed Mar. 2, 2000.

Book light product internet web page printout; http://store1.yimg.com/I/parksherman_1550_902141; printed Mar. 2, 2000.

"The Ittybitty Book Light" internet web page printout; http://www.zelco.com/10013.jpg; printed Mar. 2, 2000.

Sierra Gold Marketing "SGM28367" Clip On Light product web page printout; http://www.sgm.simplenet.com/boutique/special/sgm28367.htm; printed Mar. 2, 2000.

Amazon.com product web page printout for "Adventure Book Light and Flashlight" by Lumatec; http://www.amazon.com/exec/obidos/ASIN/b00000IJZM/104-9549104-0986847; printed Mar. 2, 2000.

Igo.com product web page printout for "NBL-100 Notebook Light" by Interex; http://www.igo.com/cgi-bin/ncommerce3/ProductDisplay?prmenbr=1&prrfnbr-522530; printed Jul. 21, 2000.

Taiwan Lighting, lamps on p. 69.

*Primary Examiner*—Stephen Husar
*Assistant Examiner*—Ali Alavi
(74) *Attorney, Agent, or Firm*—Lyon & Lyon LLP

(57) ABSTRACT

An illumination device that can use a white light diode in a flexible arm plugs into, and is powered through, a utility power jack of a portable computing device or a utility port of a portable computing device.

18 Claims, 1 Drawing Sheet

APPARATUS FOR ILLUMINATING A PORTABLE ELECTRONIC OR COMPUTING DEVICE

This application is a continuation of Ser. No. 09/330,322 filed Jun. 11, 1999, U.S. Pat. No. 6,186,636.

FIELD OF THE INVENTION

The present invention is in the field of lighting devices for portable electronic or computing devices.

BACKGROUND OF THE INVENTION

Compact electronic devices with a viewing screen or keypads have become very common and quite popular. Such devices have been popular for a number of years in connection with hand-held, portable, battery-powered gaming devices. A well-known example of such a device, that has sold millions of units, is the GAME BOY® device sold by Nintendo. More recently, other electronic devices have also included viewing screens, such as portable video cameras and cellular phones. And, of course, portable computers have long had viewing screens. Although the complexity and cost of such devices can vary greatly, it is common for such devices to use a generally flat, liquid crystal display screen.

Flat, liquid crystal display screens work very well in a well-lit area. However, when such devices are used in dimly lit areas, or at night, it can be difficult, if not impossible, for a user to see anything in the viewing screen. This problem is magnified when such a screen is used in a device that is meant to be portable, and especially when it is a small device.

If a portable device is sufficiently complex, and generally more expensive, such as a portable laptop computer, the device can include lighting within the actual device. An example of such lighting is a portable laptop computer with a backlit screen. However, this solution is not always economically practical, nor does it necessarily solve the problem in smaller devices. Also, if an electronic device does not have a viewing screen, then this option is not even available.

To solve this problem, especially in connection with hand-held, portable, battery-powered gaming devices, a number of different solutions have been proposed. Such solutions have typically included add-on devices with their own source of electrical power. These devices can be designed to fit onto the electronic device or be designed for use in connection with the electronic device. However, because such devices use their own source of electrical power, they tend to be rather bulky and heavy. In addition, the second source of electrical power increases cost and creates the possibility of another source of power failure.

Accordingly, there is a long felt need for a simple, economical, device that can illuminate portable electronic or computing devices without the drawbacks associated with prior illumination devices.

SUMMARY OF THE INVENTION

The present invention is generally directed to an apparatus for illuminating a portable electronic device that plugs into the electronic device and is powered by the power source of the electrical device through an electronic connection to a utility power jack of the electronic device. The present invention is also generally directed to an apparatus for illuminating a portable computing device with a display screen that plugs into the computing device and is powered by the power source of the computing device through an electronic connection to a port in connection with a power source.

In a first, separate aspect of the present invention, the illumination device is a light emitting diode. A white light diode is especially preferred.

In another, separate aspect of the present invention, the illumination apparatus includes a plug that has a second utility power jack or port adapted to receive a second plug that is in electrical communication with the utility power jack or port.

In still another, separate aspect of the present invention, the illumination apparatus can include a flexible arm. This flexible arm can be adjusted as to adjust the height or angle of the illumination device relative to the portable electronic or computing device. In addition, other devices, such as a diffuser, a magnifier, or a regulator for varying the intensity of light, can also be added to the illumination apparatus.

Accordingly, it is a primary object of the present invention to provide a low-cost, practical and improved illumination apparatus for a portable electronic device that is powered by a utility jack of the electronic device.

It is also a primary object of the present invention to provide a low-cost, practical and improved illumination apparatus for a portable computing device that is powered by a utility port of the computing device.

This and further objects and advantages will be apparent to those skilled in the art in connection with the drawing and the detailed description of the preferred embodiment set forth below.

DETAILED DESCRIPTION OF THE PREFERRED EMBODIMENT

Figure 1:
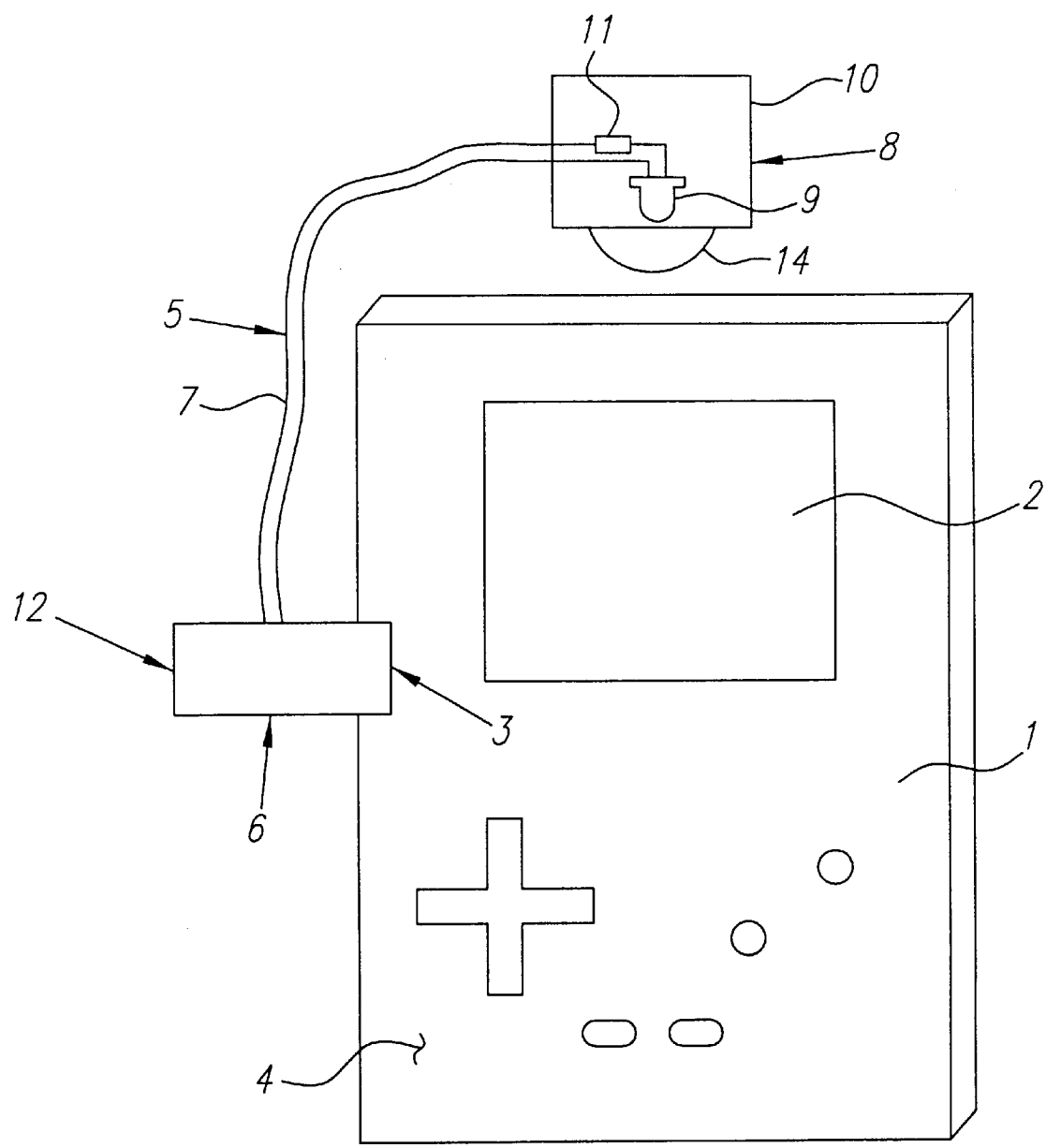
FIG. 1 is a schematic representation of a preferred embodiment of the present invention.

FIG. 1 illustrates how a preferred embodiment of the present invention can be used with a portable electronic game device, such as a GAME BOY® device. Although this drawing depicts a portable electronic game device, the invention is adaptable to any portable electronic device that has a utility power jack in electrical connection with a power source, such as a cellular phone or a video camera.

In the preferred embodiment shown in FIG. 1, the electronic device 1 has a viewing screen 2, a power source and a utility power jack. The power source and utility power jacks are not visible and are shown generally as 3 and 4, because their location and configuration will vary depending upon the design of a given portable electronic device. The power source 3 may be self-contained, such as batteries in a battery compartment. The power source 3 may or may not be augmented by a plug-in capability to a non-portable power source, such as a wall outlet.

The illumination apparatus, shown generally as 5, includes a plug, shown generally as 6, for plugging the illumination apparatus 5 into the utility power jack 4 of the electronic device 1. The exact configuration of the plug 6 should be designed so as to mate with the utility power jack 4 and create a mechanical and electrical connection between the utility power jack 4 and the plug 6 when the apparatus 5 is plugged into the electronic device 1.

The illumination apparatus 5 also includes a body 7 and an illumination device 8. The body 7 connects the illumination device 8 to the plug 6, and the body is preferably comprised of a flexible arm. The illumination device 8 is electrically connected to the utility power jack 4 through the plug 6 and the body 7 so that the illumination device 8 is powered by the power source 2 when the illumination apparatus 5 is plugged into the electronic device 1. The electrical connection between the illumination device 8 and the plug 6 can be by any suitable means, such as by a wire (not shown). It is especially preferred that the body 7 can be adjusted, when the apparatus 5 is plugged into the utility power jack 4, to adjust the height and/or the angle of the illumination device 8 relative to the electronic device 1.

In the preferred embodiment of the present invention, the illumination device 8 is comprised of a light emitting diode ("LED") 9 housed in a case housing 10. The housing 10 can also include suitable electronics, such as a resistor 11, or a regulator (not shown) for varying the intensity of light given off by the LED. In an especially preferred embodiment, the LED 9 is a white light diode. The housing can also include additional features, such as a diffuser lens 9, or a magnifier (not shown).

When the plug 6 of the illumination apparatus 5 is plugged into the utility power jack 4 of the electronic device 1, it necessarily occupies the connection that the utility power jack 4 would otherwise provide to a user of the electronic device 1. Because a user of the electronic device 1 might need to connect some other device to the utility power jack 4, it is especially preferred that the plug 6 be constructed so as to include a second utility power jack 12. The second utility power jack 12 is adapted to receive a second plug and provide a mechanical and electrical connection for the second plug equivalent to that which is provided by the utility power jack 4. Thus, the second utility power jack 12 will provide electrical communication for the second plug with the utility power jack 4 when the second plug is plugged into the plug 6 and the plug 6 is plugged into the utility power jack 4.

The present invention is also adaptable to a portable computing device with a display screen that is not illuminated by the portable computing device. In such an embodiment, the illumination apparatus is plugged into a utility port of the computing device in electrical connection with a power source instead of the utility power jack 4 of the electronic device 1. In such a device, the utility port can be any port that allows connection of additional products or communication devices, or cables, or any additional accessory or product. The illumination apparatus can have a second utility port adapted to receive a second plug that is in electrical communication with the utility port when the second plug is plugged into the plug and the plus is plugged into the utility port. In all other respects, the structure and function of the illumination apparatus would be the same as for the illumination apparatus 5 described above in connection with electronic device 1.

It will be readily apparent to those skilled in the art that still further changes and modifications in the actual concepts described herein can readily be made without departing from the spirit and scope of the invention as defined by the following claims.

What is claimed is:

1. An apparatus for illuminating a display screen of a handheld portable video game device having a utility port in electrical connection with a power source, comprising:

a plug for plugging the apparatus into the utility port;

a body connected to the plug; and an illumination device attached to the body and to be electrically connected to the utility port through the plug and the body, the illumination device to illuminate the display screen of the handheld portable video game device;

wherein the illumination device is powered by the power source when the apparatus is plugged into the utility port.

2. An apparatus as recited in claim 1, wherein the illumination device is a LED.

3. An apparatus as recited in claim 2, wherein the LED is a white light emitting diode.

4. An apparatus as recited in claim 1, wherein the plug has a second utility port adapted to receive a second plug that is in electrical communication with the utility port when the second plug is plugged into the second utility port and the plug is plugged into the utility port.

5. An apparatus as recited in claim 1, wherein the body is comprised of a flexible arm.

6. An apparatus as recited in claim 1, wherein the body can be adjusted, when the apparatus is plugged into the utility port, to adjust the height of the LED relative to the handheld portable video game device.

7. An apparatus as recited in claim 1, wherein the body can be adjusted, when the apparatus is plugged into the utility port, to adjust the angle of the LED relative to the handheld portable video game device.

8. An apparatus as recited in claim 1, wherein the body further comprises a diffuser for diffusing light given off by the LED.

9. An apparatus as recited in claim 1, wherein the body further comprises a magnifier.

10. A method of illuminating a display screen of a handheld portable video game device having a utility port in electrical connection with a power source, comprising:

providing an apparatus including a plug for plugging the apparatus into the utility port, a body connected to the plug, and an illumination device attached to the body and to be electrically connected to the utility port through the plug and the body;

coupling the plug of the apparatus with the utility port of the handheld portable video game device so as to power the illumination device; and illuminating the display screen of the handheld portable video game device with the illumination device.

11. A method as recited in claim 10, wherein the illumination device is a LED.

12. A method as recited in claim 10, wherein the LED is a white light emitting diode.

13. A method as recited in claim 10, wherein the body is comprised of a flexible arm.

14. A method as recited in claim 10, wherein the body further comprises a magnifier.

15. A method as recited in claim 10, wherein the body further comprises a diffuser for diffusing light given off by the illumination device.

16. A method as recited in claim 10, wherein the body further comprises a regulator for varying the intensity of light given off by the illumination device, and the method further comprises adjusting the regulator to regulate an intensity of light given off by the illumination device.

17. A method as recited in claim 10, wherein the plug has a second utility power jack adapted to receive a second plug that is in electrical communication with the utility port when the second plug is plugged into the second port and the plug is plugged into the utility port and the method further comprises coupling a second plug to the second utility port.

18. A method as recited in claim 10, wherein the display screen is a non-backlit display screen.

* * * * *

(12) INTER PARTES REEXAMINATION CERTIFICATE (0037th)
United States Patent
Naghi et al.

(10) Number: US 6,318,873 C1
(45) Certificate Issued: *Nov. 4, 2008

(54) APPARATUS FOR ILLUMINATING A PORTABLE ELECTRONIC OR COMPUTING DEVICE

(75) Inventors: David Naghi, Los Angeles, CA (US); Gilbert Fregoso, Santa Ana, CA (US)

(73) Assignee: Bay View Financial Corporation, Encino, CA (US)

Reexamination Request:
No. 95/000,022, Jun. 6, 2003

Reexamination Certificate for:
Patent No.: 6,318,873
Issued: Nov. 20, 2001
Appl. No.: 09/712,692
Filed: Nov. 13, 2000

( * ) Notice: This patent is subject to a terminal disclaimer.

Related U.S. Application Data

(63) Continuation of application No. 09/330,322, filed on Jun. 11, 1999, now Pat. No. 6,186,636.

(51) Int. Cl.
*F21V 33/00* (2006.01)
*F21V 23/04* (2006.01)
*A63F 13/02* (2006.01)
*G06F 1/16* (2006.01)
*H04M 1/22* (2006.01)

(52) U.S. Cl. .................. 362/85; 362/109; 362/197; 362/198; 362/253; 362/285; 362/311; 362/84

(58) Field of Classification Search ............... None
See application file for complete search history.

(56) References Cited

U.S. PATENT DOCUMENTS

| | | |
|---|---|---|
| 4,312,507 A | 1/1982 | Smith et al. |
| 5,078,399 A | 1/1992 | Lennon, Jr. |
| 5,091,832 A | 2/1992 | Tortola et al. |
| 5,165,779 A | 11/1992 | Tortola et al. |
| 5,203,622 A | 4/1993 | Sottile |
| 5,247,314 A | 9/1993 | Stephenson |
| 5,325,280 A | 6/1994 | Tortola |
| 5,486,986 A | 1/1996 | Brada |
| 5,590,950 A | 1/1997 | Hildebrand |
| 5,615,945 A | 4/1997 | Tseng |
| 5,707,137 A | 1/1998 | Hon |
| 5,803,572 A | 9/1998 | Brada |
| 5,868,487 A | 2/1999 | Polley et al. |
| 5,899,553 A | 5/1999 | Howell |
| 6,135,450 A | 10/2000 | Huang et al. |
| D435,679 S | 12/2000 | Naghi et al. |
| 6,186,636 B1 | 2/2001 | Naghi et al. |
| 6,238,291 B1 | 5/2001 | Fujimoto et al. |
| D476,106 S | 6/2003 | Kim |
| 6,575,593 B2 | 6/2003 | Krietzman |
| 2001/0048409 A1 | 12/2001 | Kim |

FOREIGN PATENT DOCUMENTS

| | | |
|---|---|---|
| DE | 42 02 776 A1 | 8/1993 |
| DE | G 84 17 969.7 | 3/1995 |
| EP | 0 478 802 A1 | 4/1992 |
| EP | 0 675 476 A1 | 3/1995 |
| FR | 2 754 588 | 4/1988 |

(Continued)

OTHER PUBLICATIONS

Case No. 01–10825 DT (BQRx) First Amended Complaint for Declaratory Judgment of Patent Invalidity and Non–Infringement and for Injunctive Relief; Demand for Jury Trial. (Feb. 25, 2002).

(Continued)

*Primary Examiner*—Linh My Nguyen

(57) ABSTRACT

An illumination device that can use a white light diode in a flexible arm plugs into, and is powered through, a utility power jack of a portable computing device or a utility port of a portable computing device.

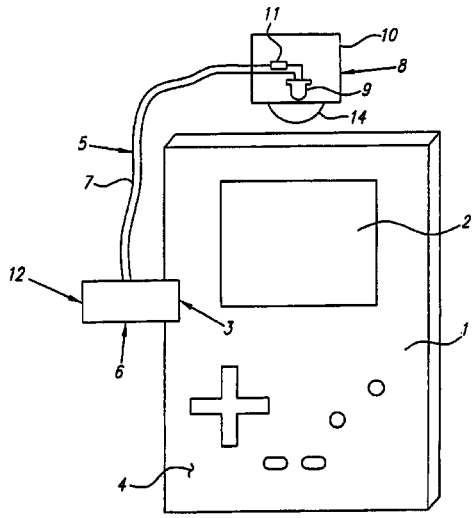

FOREIGN PATENT DOCUMENTS

| JP | 04-070626 | 3/1992 |
| --- | --- | --- |
| JP | 04-333023 | 11/1992 |
| JP | 09-211448 | 8/1997 |
| JP | 10-246886 | 9/1998 |
| JP | 10-326659 | 12/1998 |
| JP | 11-119206 | 4/1999 |
| JP | 2000-330110 | 11/2000 |

OTHER PUBLICATIONS

Case No. 01–10825 DT (BQRx) Defendant Nyko Technologies, Inc.'s Opening Memorandum of Points and Authorities in Support of Claim Construction of U.S. Pat. Nos. 6,260,984 and 6,318,873. (Mar. 10, 2003).

Case No. 01–10825 DT (BQRx) Electro source LLC's Opposition to Nyko Technologies, Inc's Opening Memorandum in support of Claim Construction of U.S. Pat. Nos. 6,260,984 and 6,318,873. (Mar. 17, 2003).

Case No. 01–10825 DT (BQRx) Reply to Electro Source LLC's Opposition to Nyko Technologies, Inc's Opening Memorandum in Support of Claim Construction of U.S. Pat. Nos. 6,260,984 and 6,318,873. (Mar. 24, 2003).

Case No. CV 01–10825 DT (MANx) Consolidated with: Case No. CV 02–00520 DT (MANx) Order Re Markman Hearing (Apr. 4, 2003).

Case No. CV 01–10825 DT (MANx) Consolidated with: Case No. CV 02–00520 DT (MANx) Joint Stipulation and Order Dismissing Without Prejudice Under Fed. R. Civ. P. §41 (a)(2) The Mutual Claims and Counterclaims by the Parties (Jun. 30, 2003).

Stefan Peichl; Heidelber, Germany, Lighton V1.0; © 1999; pp. 12; http://www.home.t–online.de/home/stefan.peichl/ email:stefan.peichl@t–online.de.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–18 are cancelled.

\* \* \* \* \*